Aug. 6, 1929.  V. J. BURNELLI  1,723,763
AIRPLANE
Filed Aug. 10, 1927

INVENTOR
Vincent J. Burnelli
BY
Frederick W. Barker
ATTORNEY

Patented Aug. 6, 1929.

1,723,763

UNITED STATES PATENT OFFICE.

VINCENT J. BURNELLI, OF NEW YORK, N. Y.

AIRPLANE.

Application filed August 10, 1927. Serial No. 211,950.

This invention relates to engine mounts for use with airplanes and my improvement is directed to a mount having pivotal connection with an airplane body of such character that the mount, with the engine it supports, can be swung laterally outside the body for convenience in inspecting and adjusting the engine. Also my invention includes the provision of easily releasable means of connection between the mount and body to permit the quick and complete removal of said mount and its equally expeditious replacement.

With these and other objects in view my improved mount is composed of a frame-like structure to constitute a cradle adapted for the reception and support of an engine, elements of said structure having converging relation at one end where they are adapted for pivotal engagement with the airplane body in a single vertical axis.

Other features and advantages of my invention will hereinafter appear.

In said views let 1 and 2 indicate respectively upper and lower longitudinal members of the frame-work of an airplane, 3 an upright member of said frame-work, 4 the airplane nose portion which is in the form of a removable shell, 5 an engine forming part of the power plant and 6 a propeller.

Figure 1:
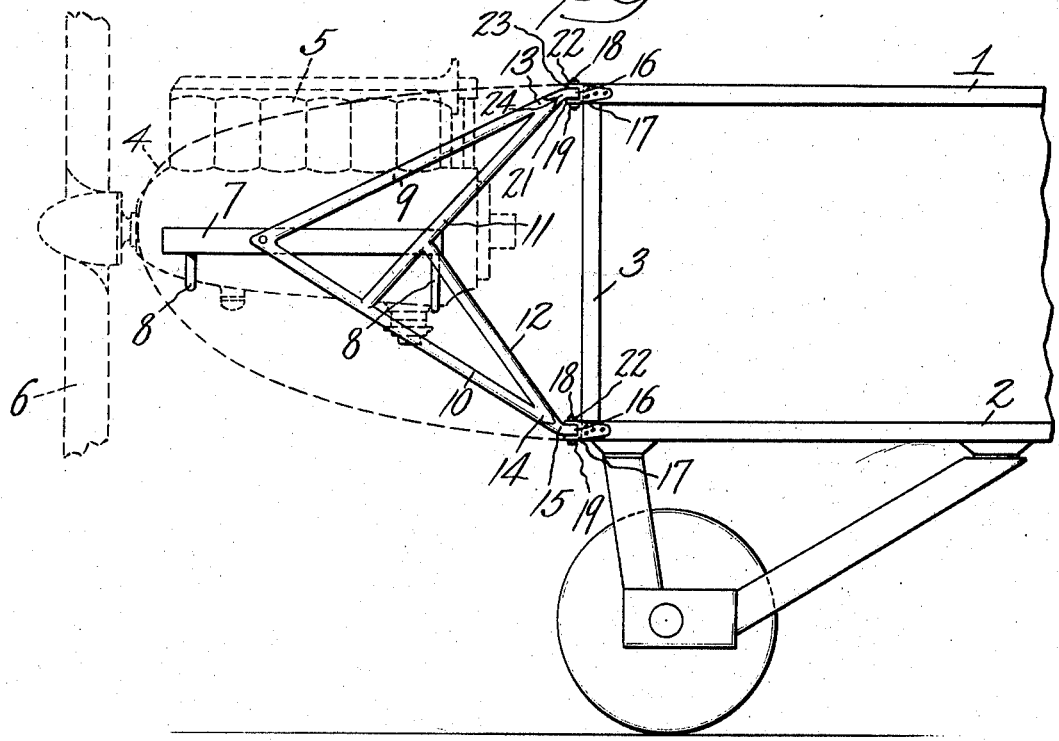
Figure 1 is a partial side elevation of an airplane showing my improved engine mount pivotally connected to frame members of the airplane body.
Figure 2:
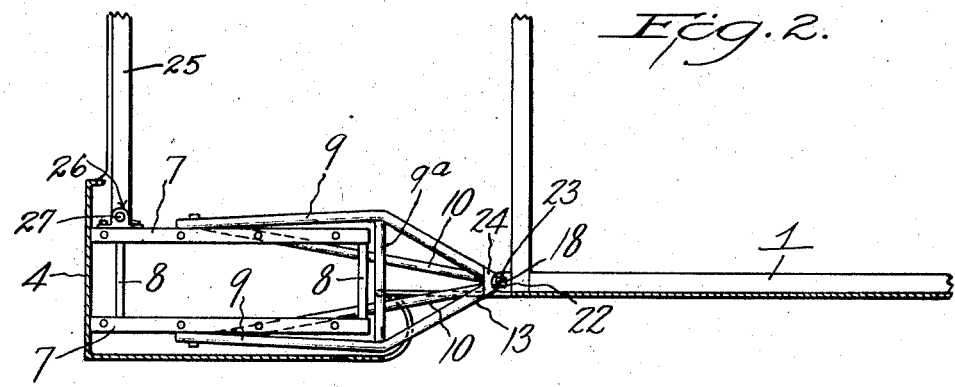
Fig. 2 is a partial plan view thereof.

It is to be understood that the showing is that of an airplane having two engines disposed respectively at opposite sides in the nose portion; each engine having a similar mount, although in Fig. 2 only one engine, with its mount, is illustrated.

The engine is shown as supported by a mount having the horizontal bars 7, 7 spaced in parallelism and connected by curved straps 8, 8 that provide a cradle or seat for engine 5.

The mount also includes series of brace members connecting at different points with the respective bars 7, 7 and extending convergingly to the rearward of the mount for vertical axial connection with the body. Thus each bar 7 has connected thereto a brace member 9 that extends upwardly and rearwardly therefrom and also a brace member 10 that continues downwardly therefrom, said members 9 and 10 having converging relation at a point forwardly of bar 7 where they are unitedly connected with said bar. Also extended between each member 10 and the rearward end of member 9 is a brace member 11, said members 11 and 9 having rearwardly converging relation, and member 11 connecting with member 10 at a point intermediate the length of the latter, the member 11 also having connection with the rear end of bar 7. An additional brace member 12 extends from member 11, where the latter connects with bar 7, into converging relation with member 10. The members 9 at opposite sides of the mount are held suitably spaced apart by means of a compression member $9^a$.

The rearward point of convergence of members 9 and 11 is indicated at 13, and corresponding members from both sides of the mount merge together at this point. Similarly the members 10 and 12 from both sides of the mount meet at a point of convergence 14.

Figure 3:
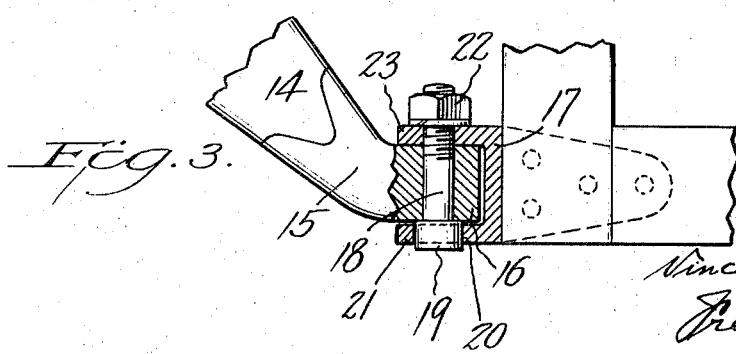
Fig. 3 is an enlarged detail view showing one of the pivotal connections.

In Fig. 3 the converged members 10 and 12 are shown as provided with ferrule 15, having a horizontal terminal portion 16 that lies within the arms of a yoke 17 secured to a longitudinal frame member, said portion 16 and yoke 17 being connected by a vertical pivot 18. The pivot is in the form of a bolt having a head 19 that fits freely in a hole 20 provided therefor in the lower arm 21 of the yoke, the other end of the bolt receiving a nut 22. By this arrangement the nut can be tightened up to clamp together portion 16 and yoke arm 23 without distortion of said yoke arms. The ferrule 24 at the point of convergence 13 and the pivotal engaging means therefor, co-axial with the pivotal means indicated in Fig. 3, are of corresponding character therewith.

In Fig. 2 will be seen a portion of a transverse frame member 25, intended as a radiator support, the radiator not being shown. A lug 26 projecting from a mount bar 7 permits removable connection to be made between the member 25 and the mount by means of a bolt 27. Thus said member 25 is supported by the engine mounts which, as stated, are positioned at opposite sides of the fuselage.

From the foregoing description of the co-axial means for pivotally connecting the mount members to the longitudinal frame members of the airplane body it will be appreciated that by merely loosening the nuts 22 the mount can be swung outwardly upon the common axis of its bolts 18, and that by disengagement of the bolts the entire mount can be removed from the airplane body.

Variations within the spirit and scope of my invention are equally comprehended in the foregoing disclosure.

I claim:

The combination with an airplane having a body portion with upper and lower longitudinal frame members, of an engine mount, and a supporting frame engaging said mount at opposite sides thereof, opposite side elements of said frame diverging rearwardly in vertical planes and converging laterally, said elements having pivotal and removable engagement with said upper and lower frame members in a single vertically axial line.

Signed at the city of New York, in the county of New York and State of New York this fifth day of August A. D. 1927.

VINCENT J. BURNELLI.